United States Patent
Maruko et al.

(10) Patent No.: US 12,467,674 B2
(45) Date of Patent: Nov. 11, 2025

(54) REFRIGERATION CYCLE APPARATUS

(71) Applicant: Carrier Japan Corporation, Tokyo (JP)

(72) Inventors: Kohei Maruko, Fuji (JP); Shohei Arita, Fuji (JP); Masaaki Sato, Fuji (JP); Hiroichi Yamaguchi, Fuji (JP); Atsushi Baba, Fuji (JP); Yukio Kiguchi, Fuji (JP)

(73) Assignee: Carrier Japan Corporation, Tokyo (JP)

( * ) Notice: Subject to any disclaimer, the term of this patent is extended or adjusted under 35 U.S.C. 154(b) by 98 days.

(21) Appl. No.: 18/472,461

(22) Filed: Sep. 22, 2023

(65) Prior Publication Data

US 2024/0011689 A1    Jan. 11, 2024

Related U.S. Application Data

(63) Continuation of application No. PCT/JP2021/012250, filed on Mar. 24, 2021.

(51) Int. Cl.
*F25B 49/02* (2006.01)
*F25B 1/00* (2006.01)

(52) U.S. Cl.
CPC ............. *F25B 49/02* (2013.01); *F25B 1/00* (2013.01); *F25B 2600/2513* (2013.01)

(58) Field of Classification Search
CPC ..... F25B 49/02; F25B 1/00; F25B 2600/2513
See application file for complete search history.

(56) References Cited

U.S. PATENT DOCUMENTS

| | | | |
|---|---|---|---|
| 2003/0068236 A1* | 4/2003 | Tadano | F01C 21/108 417/410.3 |
| 2006/0048539 A1* | 3/2006 | Takechi | F25B 13/00 62/197 |
| 2012/0198868 A1 | 8/2012 | Huff et al. | |

FOREIGN PATENT DOCUMENTS

| | | |
|---|---|---|
| EP | 1659348 A1 | 5/2006 |
| JP | 2000234811 A | 8/2000 |
| JP | 2013155992 A | 8/2013 |
| JP | 2017026238 A | 2/2017 |
| JP | 2019190409 A | 10/2019 |

OTHER PUBLICATIONS

Extended European Search Report, EP Application No. 21932971.1, Dec. 16, 2024, 8 pages.
PCT Search Report and Written Opinion mailed on Apr. 27, 2021, for PCT Application No. PCT/JP2021/012250, 14 pages.

* cited by examiner

*Primary Examiner* — Nael N Babaa
(74) *Attorney, Agent, or Firm* — Lee & Hayes, P.C.

(57) ABSTRACT

According to one embodiment, a refrigeration cycle apparatus includes a main flow channel of a refrigerant, a compressor, a condenser, an evaporator, a branch channel, an expansion valve, a supercooling heat exchanger, an injection flow channel, and a control unit. The control unit determines, based on whether the determination condition is satisfied or not, a determination condition for adjusting an opening degree of the expansion valve and adjusts the opening degree of the expansion valve according to a first target value for a discharge temperature of the refrigerant from the compressor, or a second target value for a superheat degree of the refrigerant flowing through the injection flow channel.

5 Claims, 4 Drawing Sheets

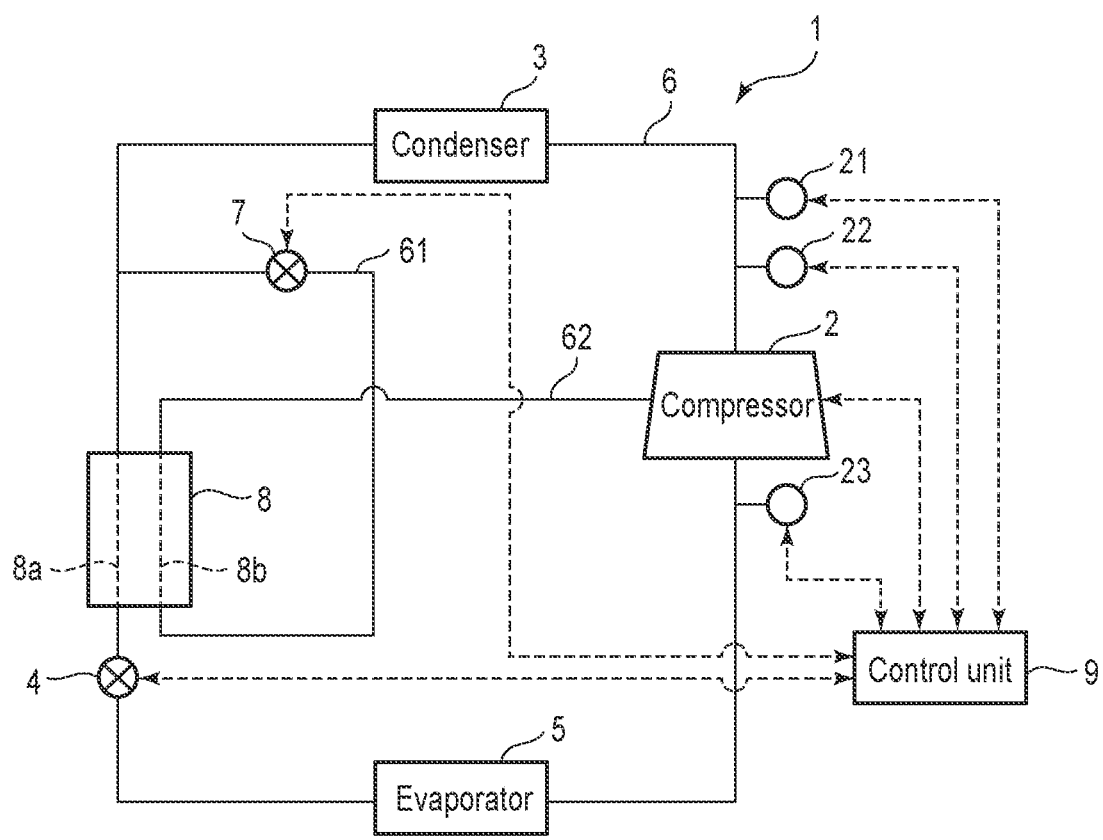
F I G. 1

REFRIGERATION CYCLE APPARATUS

CROSS-REFERENCE TO RELATED APPLICATIONS

This application is a Continuation Application of PCT Application No. PCT/JP2021/012250, filed Mar. 24, 2021, the entire contents of which are incorporated herein by reference.

FIELD

Embodiments described herein relate generally to a refrigeration cycle apparatus.

BACKGROUND

The refrigeration cycle apparatuses comprising an injection flow channel can be classified into two types: refrigeration cycle apparatuses employing a gas injection and refrigeration cycle apparatuses employing a liquid injection. The gas injection aims to improve Coefficient Of Performance (COP) and a capacity (hereinafter collectively referred to as "performance") of the refrigeration cycle apparatus. The liquid injection aims to address a compressor becoming a superheated condition caused by a high compression ratio operation and the like, in other words, aims to cool the compressor.

A method of switching between the gas injection and the liquid injection according to a situation (hereinafter referred to as "a hybrid injection") is known as a refrigeration cycle that satisfies both of improvement of the performance and cooling of the compressor. In a conventional hybrid injection, a divided flow side refrigerant is evaporated by using a supercooling heat exchanger and injected into the compressor under a condition that the cooling of the compressor is unnecessary. Accordingly, a supercool degree of a main flow side refrigerant is increased, and the performance of the refrigeration cycle apparatus is improved. Under the condition where the cooling of the compressor, in other words, lowering of a discharge temperature, is required, a liquid-phase refrigerant is injected directly into the compressor without passing through the supercooling heat exchanger.

However, this method cannot achieve the improvement of the performance in the case where the liquid injection is performed since the supercooling heat exchanger is used only in the case where the gas injection is performed. In addition, in the case where a stability of the gas injection control is low, a superheat degree of the refrigerant to be injected is insufficient and thus the compressor is cooled, similarly to the liquid injection. It is therefore necessary to suppress the compressor being excessively cooled and a liquid pressure compression occurring.

The present invention has been conceived in consideration of the above, and embodiments described herein aim to provide a refrigeration cycle apparatus capable of appropriately switching between a gas injection and a liquid injection in a hybrid injection and improving a performance.

BRIEF DESCRIPTION OF THE DRAWINGS

FIG. 1 is a circuit diagram schematically showing a refrigeration cycle of a refrigeration cycle apparatus according to a first embodiment.

DETAILED DESCRIPTION

Figure 2:
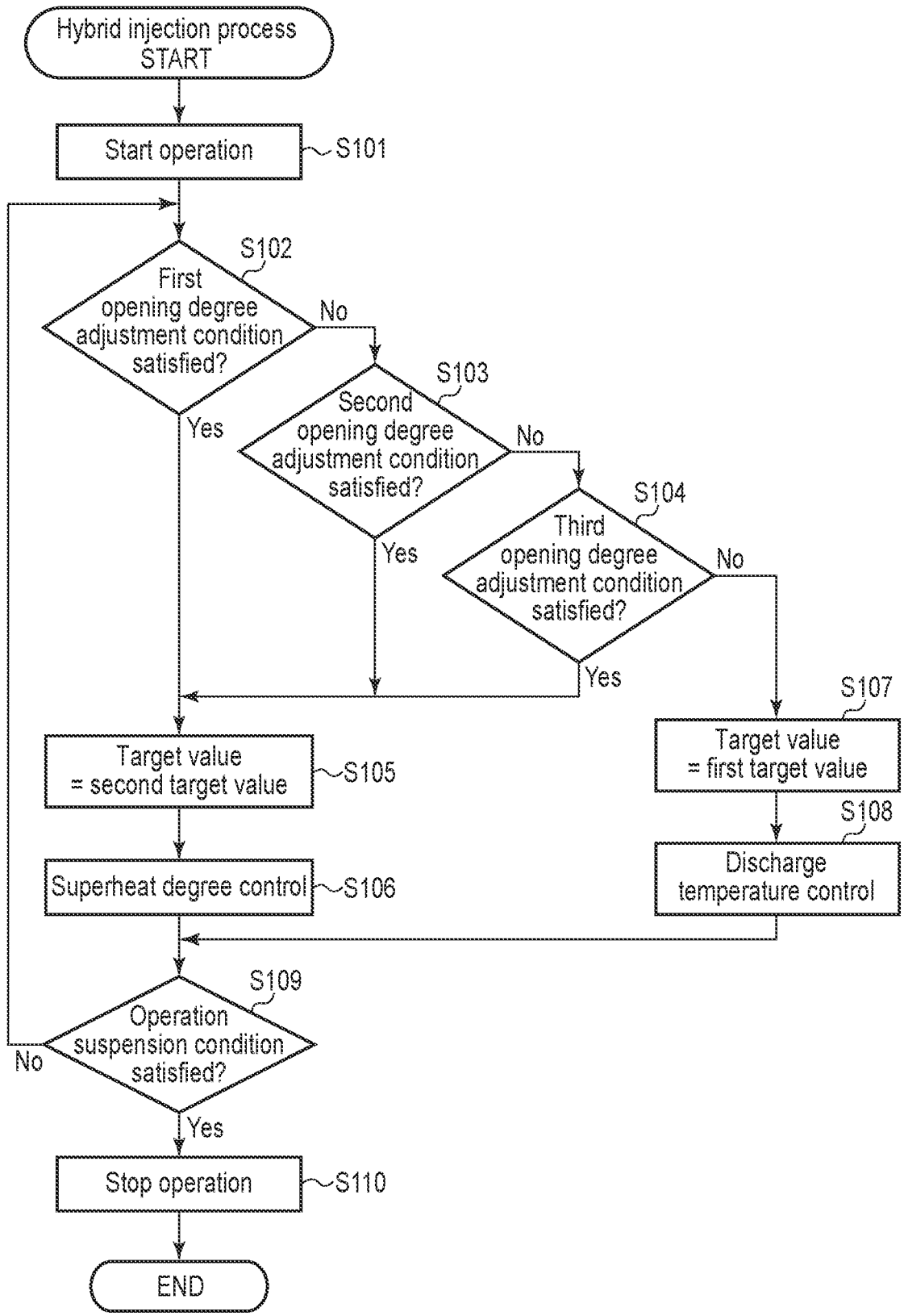
FIG. 2 is a control flowchart showing a control during a hybrid injection process in the refrigeration cycle apparatus of the first embodiment.

Embodiments of the present invention will be described hereinafter with reference to the accompanying drawings.

In general, according to one embodiment, a refrigeration cycle apparatus includes a main flow channel, a compressor, a condenser, an evaporator, a branch channel, an expansion valve, a supercooling heat exchanger, an injection flow channel, and a control unit. A refrigerant circulates through the main flow channel. The compressor discharges the refrigerant to the main flow channel. The condenser condenses the refrigerant. The evaporator evaporates the refrigerant. The branch channel divides a part of the refrigerant flowing from the condenser to the evaporator from the main flow channel in a downstream of the condenser. The expansion valve adjusts a flow rate of the refrigerant flowing through the branch channel. The supercooling heat exchanger performs a heat exchange between the refrigerant passing through the expansion valve and flowing through the branch channel and the refrigerant flowing through the main flow channel in the downstream of the condenser. The injection flow channel injects the refrigerant of a divided flow side flowing out of the supercooling heat exchanger into the compressor. The control unit determines a determination condition for adjusting an opening degree of the expansion valve and adjusts the opening degree of the expansion valve based on a target value. According to whether the determination condition is satisfied or not, the control unit sets either a first target value for a discharge temperature of the refrigerant from the compressor or a second target value for the superheat degree of the refrigerant flowing through the injection flow channel to the target value.

First Embodiment

FIG. 1 is a circuit diagram schematically showing a refrigeration cycle of a refrigeration cycle apparatus 1 of the present embodiment. The refrigeration cycle apparatus 1 is operable in each of a cooling mode, a heating mode, and both modes and applicable as, for example, an air conditioner, a water-cooled heat source unit, an air-cooled heat pump chilling unit, a condensing unit, and the like.

As shown in FIG. 1, the refrigeration cycle apparatus 1 comprises a compressor 2, a condenser 3, an expansion valve (hereinafter referred to as a main flow channel expansion valve) 4, an evaporator 5, a supercooling heat exchanger 8, a four-way valve (not shown), and the like as main elements. These elements are connected to each other by a refrigerant pipe (hereinafter referred to as a main flow channel) 6 in which the refrigerant circulates.

The compressor 2 comprises a closed container, a rotary compression mechanism, an electric mechanism and the like as main elements and discharges a high-temperature, high-pressure gas-phase refrigerant to the main flow channel 6. The rotary compression mechanism comprises, for example, a cylinder, a rotating shaft, a roller, a vane, and the like.

The condenser 3 condenses the high-temperature, high-pressure gas-phase refrigerant discharged from the compressor 2 by the heat exchange with air and the like and changes this refrigerant to a high-pressure liquid-phase refrigerant.

The main flow channel expansion valve 4 decompresses the high-pressure liquid-phase refrigerant which is condensed by the condenser 3, and heat-exchanged in the supercooling heat exchanger 8, to be described later, and changes this refrigerant to a low-pressure gas-liquid two-phase refrigerant.

The evaporator 5 evaporates the gas-liquid two-phase refrigerant that passed through the main flow channel expansion valve 4 by the heat exchange with air and the like and changes this refrigerant to a low-temperature, low-pressure gas-phase refrigerant.

A first detection unit 21 and a second detection unit 22 are provided in the main flow channel 6 between the compressor 2 and the condenser 3. The first detection unit 21 detects the discharge temperature of the refrigerant from the compressor 2 and is a sensor (hereinafter referred to as a discharge temperature sensor 21) whose detection element is, for example, arranged in a pipe of the main flow channel 6 to detect a temperature of the high-temperature, high-pressure gas-phase refrigerant discharged from the compressor 2 (hereinafter simply referred to as a discharge temperature). The second detection unit 22 detects the discharge pressure of the refrigerant from the compressor 2 and is a sensor (hereinafter referred to as a discharge pressure sensor 22) whose detection element is, for example, arranged in the pipe of the main flow channel 6 to detect, a pressure of the high-temperature, high-pressure gas-phase refrigerant discharged from the compressor 2 (hereinafter simply referred to as a discharge pressure). In addition, a third detection unit 23 is arranged in the main flow channel 6 between the compressor 2 and the evaporator The third detection unit 23 detects a suction pressure of the refrigerant sucked by the compressor 2 (hereinafter simply referred to as a suction pressure) and is a sensor whose detection element is, for example, arranged in the pipe of the main flow channel 6 to detect a pressure of the low-temperature, low-pressure gas-phase refrigerant sucked by the compressor 2 (hereinafter simply referred to as a suction pressure sensor 23). The discharge temperature sensor 21 gives a value of the detected discharge temperature, the discharge pressure sensor 22 gives a value of the detected discharge pressure, and the suction pressure sensor 23 gives a value of the detected suction pressure each to the control unit 9 described later via a wire or wirelessly.

As shown in FIG. 1, the main flow channel 6 is branched by the branch channel 61 between the condenser 3 and the supercooling heat exchanger 8 and then bypassed to the compressor 2 through the injection flow channel 62. The branch channel 61 and the injection flow channel 62 are bypass flow channels of the main flow channel 6. The branch channel 61 divides a part of the refrigerant that flows from the condenser 3 to the evaporator 5 from the main flow channel 6 in the downstream of the condenser 3 and the upstream of the supercooling heat exchanger 8.

The expansion valve (hereinafter referred to as a branch channel expansion valve) 7 and the supercooling heat exchanger 8 are arranged in the branch channel 61.

The branch channel expansion valve 7 decompresses the high-pressure liquid-phase refrigerant flowing through the branch channel 61 and changes this refrigerant to the low-pressure gas-liquid two-phase refrigerant. In addition, the branch channel expansion valve 7 adjusts the flow rate of the refrigerant flowing through the branch channel 61 according to the opening degree of the branch channel expansion valve 7.

The supercooling heat exchanger 8 performs the heat exchange between the low-pressure gas-liquid two-phase refrigerant passing through the branch channel expansion valve 7 and flowing through the branch channel 61 and the high-pressure liquid-phase refrigerant flowing through the main flow channel 6 in the downstream of the condenser 3 and the upstream of the main flow channel expansion valve 4. The supercooling heat exchanger 8 comprises a main flow side flow channel 8a and a divided flow side flow channel 8b. The main flow side flow channel 8a is connected to the main flow channel 6 and constitutes a part of the main flow channel 6. The divided flow side flow channel 8b is connected to each of the branch channel 61 and the injection flow channel 62 and constitutes a part of the branch channel 61 and the injection flow channel 62, in other words, a part of the bypass flow channel. As a result, the heat exchange is performed between the high-pressure liquid-phase refrigerant flowing through the main flow side flow channel 8a and the low-pressure gas-liquid two-phase refrigerant flowing through the divided flow side flow channel 8b.

The injection flow channel 62 is a flow channel for injection of the gas-liquid two-phase refrigerant flowing out of the divided flow side flow channel 8b of the supercooling heat exchanger 8 to the compressor 2. In the present embodiment, a hybrid injection process to be described later is performed by injecting the gas-liquid two-phase refrigerant of the divided flow side flow channel from the injection flow channel 62 to the compressor 2.

In addition to these constituent elements, the refrigeration cycle apparatus 1 comprises a control unit 9 controlling operations of these constituent elements. In the present embodiment, the control unit 9 controls an operation of each of the compressor 2, the main flow channel expansion valve 4, and the branch channel expansion valve 7. The control unit 9 controls, for example, a start and a suspension of the operation of the compressor 2, the number of rotations, a frequency and the like, and adjusts the opening degree of each of the main flow channel expansion valve 4 and the branch channel expansion valve 7 in these controls.

The control unit 9 includes a CPU, a memory, a storage device (nonvolatile memory), an input/output circuit, a timer, and the like and performs a predetermined arithmetic processing. The control unit 9, for example, reads various data by the input/output circuit, performs the arithmetic processing by using a program read from the storage device into the memory, and controls the operation of each of the compressor 2, the main flow channel expansion valve 4, and the branch channel expansion valve 7 based on a result of the processing. At this time, the control unit 9 transmits/receives a control signal and a data signal via the wire or wirelessly between the compressor 2, the main flow channel expansion valve 4, and the branch channel expansion valve 7. In the example shown in FIG. 1, the control unit 9 is included independently of the compressor 2, the main flow channel expansion valve 4, and the branch channel expansion valve 7. For example, however, the compressor 2, the main flow channel expansion valve 4, and the branch channel expansion valve 7 may each comprise the control unit. In this case, the control signal and the data signal may be transmitted/received between the control unit of each of the compressor 2, the main flow channel expansion valve 4, and the branch channel expansion valve 7 via the wire or wirelessly. In addition, the refrigeration cycle apparatus 1 may comprise a main control unit which controls the control unit of each of the compressor 2, the main flow channel expansion valve 4, and the branch channel expansion valve 7 at a higher level.

An operation control of the refrigeration cycle apparatus 1 comprising the above structure which is performed by the control unit 9, more specifically, the control for performing the hybrid injection which switches between the gas injection and the liquid injection according to a state of the operation (herein after referred to as a hybrid injection process) will be described hereinafter in accordance with the control flow of the control unit 9. The gas injection is a control for achieving improvement of the performance of the refrigeration cycle apparatus 1 and the like by controlling the superheat degree of the gas-liquid two-phase refrigerant of the divided flow side flowing out of the divided flow side flow channel 8b of the supercooling heat exchanger 8 (hereinafter referred to as a superheat degree control). The liquid injection is a control for cooling the compressor 2 by injecting the gas-liquid two-phase refrigerant of the divided flow side, and lowering the discharge temperature of the refrigerant from the compressor 2 (hereinafter referred to as a discharge temperature control). FIG. 2 shows a control flow of the control unit 9 in the hybrid injection process.

The refrigeration cycle apparatus 1 starts the operation for the hybrid injection process (S101). More specifically, the control unit 9 activates the compressor 2, opens the main flow channel expansion valve 4 and circulates the refrigerant to the main flow channel 6. That the refrigeration cycle apparatus 1 is in operation is a prerequisite for the hybrid injection process. The control unit 9 can perform the hybrid injection process by starting the operation of the refrigeration cycle apparatus 1. Therefore, the hybrid injection process is not performed in the case where the refrigeration cycle apparatus 1 is not in operation.

In a state where the refrigeration cycle apparatus 1 is in operation, the control unit 9 determines whether the determination condition for adjusting the opening degree of the branch channel expansion valve 7 (hereinafter referred to as an opening degree adjustment condition) is satisfied. The opening degree adjustment condition is a determination condition regarding how to adjust the opening degree of the branch channel expansion valve 7. The control unit 9 sets either the first target value or the second target value to a target value of the opening degree adjustment of the branch channel expansion valve 7 according to whether the opening degree adjustment condition is satisfied or not. As a result, the opening degree of the branch channel expansion valve 7 is adjusted based on the target value, in other words, the first target value or the second target value.

The first target value is a target value for the discharge temperature of the refrigerant from the compressor 2. The second target value is a target value for the superheat degree of the refrigerant flowing through the injection flow channel 62 (hereinafter simply referred to as a superheat degree). These first and second target values are preset values determined based on, for example, the COP and the specification, the capacity and the like of the compressor 2. These preset values are stored in, for example, the storage device of the control unit 9 and read into the memory and set to target values in the determination of the opening degree adjustment condition.

In the present embodiment, the control unit 9 determines each of the first, second, and third determination conditions that are three different conditions as the opening degree adjustment condition. In the case where at least any one of the first to third opening degree adjustment conditions is satisfied, the opening degree adjustment condition is determined to be satisfied and, in the case where none of the conditions are satisfied, the opening degree adjustment condition is determined to be unsatisfied. For example, when any of the first to third opening degree adjustment conditions is satisfied, the control unit 9 assumes that the opening degree adjustment condition is satisfied and then performs the superheat degree control based on the second target value. On the other hand, when none of the first to third opening degree adjustment conditions are satisfied, the control unit 9 assumes that the opening degree adjustment condition is not satisfied and then performs the discharge temperature control based on the first target value.

As shown in FIG. 2, the control unit 9 first determines the first opening degree adjustment condition (S102). The first opening degree adjustment condition is a first determination condition of the opening degree adjustment condition, and is the determination condition of whether the opening degree of the branch channel expansion valve 7 is less than or equal to a predetermined opening degree. The predetermined opening degree is a value of the opening degree of the branch channel expansion valve 7 which requires switching between the superheat degree control and the discharge temperature control. An expansion valve including the branch channel expansion valve 7 may generally have a characteristic that a fluid (the refrigerant) does not flow at the opening degree lower than or equal to a certain opening degree even in the case where the opening degree is more than or equal to (zero). Therefore, by considering this characteristic, the superheat degree control and the discharge temperature control can be switched appropriately. Considering this characteristic, a value of the predetermined opening degree is preferably 10% of a maximum opening degree of the branch channel expansion valve 7. However, 10% is a general target of the opening degree at which the fluid (refrigerant) stops flowing. For example, the value of the predetermined opening degree may be set to 5%, 15%, or the like in the case where the opening degree is 5%, 15%, or the like. The predetermined opening degree is stored in, for example, the storage device of the control unit 9, and read into the memory and used as a parameter in the determination of the first opening degree adjustment condition.

The control unit 9 obtains a current value of the opening degree from the branch channel expansion valve 7 and compares the current value with the predetermined opening degree in the determination of the first opening degree adjustment condition. When the current value of the opening degree is less than or equal to the predetermined opening degree, the control unit 9 determines that the first opening degree adjustment condition is satisfied (Yes in S102). On the other hand, when the current value exceeds the predetermined opening degree, the control unit 9 determines that the first opening degree adjustment condition is not satisfied (No in S102).

When the first opening degree adjustment condition is not satisfied (No in S102), the control unit 9 determines the second opening degree adjustment condition (S103). The second opening degree adjustment condition is the second determination condition for the opening degree adjustment condition. The second opening degree adjustment condition is the determination condition of whether a difference between the first target value and the discharge temperature is more than or equal to a predetermined difference. Alternatively, the second opening degree adjustment condition is the determination condition of whether the discharge temperature is less than or equal to a predetermined threshold value. The predetermined difference is a value of a temperature difference between the first target value and the discharge temperature that requires switching between the superheat degree control and the discharge temperature control, in other words, a value of the temperature difference between a control target value of the discharge temperature and a measured value (the current value). The predetermined threshold value is a value of the discharge temperature that requires switching between the superheat degree control and the discharge temperature control. When the measured value of the discharge temperature is sufficiently lower than the first target value, it can be determined that, for example, an amount of the refrigerant flowing through the branch channel 61 and the injection flow channel 62 to be injected into the compressor 2 is excessive, in other words, that the discharge temperature control (liquid injection) is excessive. Considering this point, the predetermined threshold value is set to a value smaller than the first target value. As a result, when the measured value of the discharge temperature decreases by a certain temperature (difference between the first target value and the predetermined threshold value) relative to the first target value, the discharge temperature control can be switched to the superheat degree control. The value of the predetermined difference or the predetermined threshold value is stored in, for example, the storage device of the control unit 9 and read into the memory and used as the parameter in the determination of the second opening degree adjustment condition.

In the determination of the second opening degree adjustment condition, the control unit 9 obtains the current value of the discharge temperature from the discharge temperature sensor 21, calculates the temperature difference between the current value and the first target value and compares the calculated value with the predetermined difference. When the temperature difference is more than or equal to the predetermined difference, the control unit 9 determines that the second opening degree adjustment condition is satisfied (Yes in S103). On the other hand, when the temperature difference is less than the predetermined difference, the control unit 9 determines that the second opening degree adjustment condition is not satisfied (No in S103). Alternatively, instead of this, the control unit 9 compares the current value of the discharge temperature obtained from the discharge temperature sensor 21 with the predetermined threshold value. When the discharge temperature is less than or equal to the predetermined threshold value, the control unit 9 determines that the second opening degree adjustment condition is satisfied (Yes in S103). On the other hand, when the discharge temperature exceeds the predetermined threshold value, the control unit 9 determines that the second opening degree adjustment condition is not satisfied (No in S103).

When the second opening degree adjustment condition is not satisfied (No in S103), the control unit 9 determines the third opening degree adjustment condition (S104). The third opening degree adjustment condition is the third determination condition of the opening degree adjustment condition, and is the determination condition of whether the number of rotations is less than or equal to a predetermined number of times relative to the compression ratio in the compressor 2. The compression ratio is calculated based on the discharge pressure of the refrigerant from the compressor 2 and the suction pressure of the refrigerant to the compressor 2. The predetermined number of rotations is a value of the number of rotations relative to the compression ratio which requires switching between the superheat degree control and the discharge temperature control. A variation in the discharge temperature greatly depends on the compression ratio and the number of rotations. Therefore, the superheat degree control and the discharge temperature control can be switched according to whether the third opening degree adjustment condition is satisfied or not. A value of the predetermined number of rotations is stored in, for example, the storage device of the control unit 9, and read into the memory and used as the parameter in the determination of the third opening degree adjustment condition. The compression ratio may be calculated using not the discharge pressure and the suction pressure of the compressor 2 but, for example, a condensation temperature and an evaporation temperature of the refrigerant, an outside air temperature, an evaporation temperature of the refrigerant, and the like.

Figure 3:
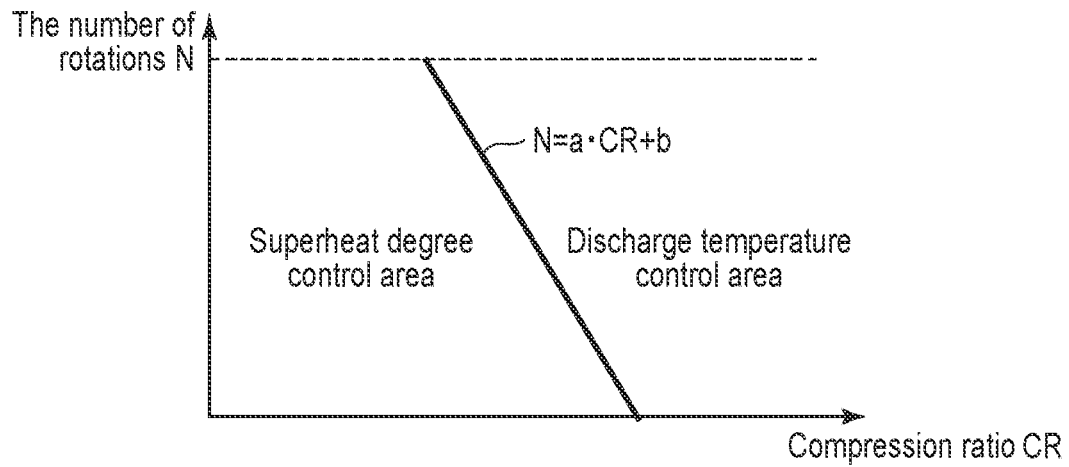
FIG. 3 is a graph showing an aspect of switching between a superheat degree control and a discharge temperature control according to a relationship between a compression ratio and the number of rotations in the hybrid injection process in the refrigeration cycle apparatus of the first embodiment.

In the determination of the third opening degree adjustment condition, the control unit 9 obtains the current value of the discharge pressure from the discharge pressure sensor 22, and further obtains the current value of the suction pressure from the suction pressure sensor 23 to calculate the compression ratio. The control unit 9 then compares the number of rotations with respect to the calculated compression ratio with the predetermined number of rotations. FIG. 3 shows an aspect of switching between the superheat degree control and the discharge temperature control according to a relationship between the compression ratio and the number of rotations in the compressor 2. As shown in FIG. 3, the relationship between the compression ratio (CR) and the number of rotations (N) is expressed by a calculation formula: a linear function $N = a \cdot CR + b$ (a and b are predetermined constants). In the example shown in FIG. 3, a superheat degree control area and a discharge temperature control area are divided by a locus of the linear function. The above linear function is an example of the relationship between the compression ratio (CR) and the number of rotations (N), but the relationship between the compression ratio (CR) and the number of rotations (N) is not limited to such a linear function. In the present embodiment, as one example, the superheat degree control is performed in an area where the number of rotations relative to the compression ratio is less than or equal to the predetermined number of rotations, and the discharge temperature control is performed in an area where the number of rotations relative to the compression ratio exceeds the predetermined number of rotations, in accordance with FIG. 3. In addition, the discharge temperature control is performed regardless of the number of rotations when the compression ratio exceeds a predetermined limit value, and the superheat degree control is performed regardless of the compression rate when the number of rotations exceeds the predetermined limit value.

Therefore, when the number of rotations relative to the compression ratio is less than or equal to the predetermined number of rotations, the control unit 9 determines that the third opening degree adjustment condition is satisfied (Yes in S104). On the other hand, when the number of rotations relative to the compression ratio exceeds the predetermined number of rotations, the control unit 9 determines that the third opening degree adjustment condition is not satisfied (No in S104).

When the first opening degree adjustment condition is satisfied in S102 (Yes in S102), the second opening degree adjustment condition is satisfied in S103 (Yes in S103), or the third opening degree adjustment condition is satisfied in S104 (Yes in S104), the control unit 9 determines that the opening degree adjustment condition is satisfied. On the other hand, when the first opening degree adjustment condition is not satisfied in S102 (No in S102), the second opening degree adjustment condition is not satisfied in S103 (No in S103), and the third opening degree adjustment condition is not satisfied in S104 (No in S104), the control unit 9 determines that the opening degree adjustment condition is not satisfied. The first opening degree adjustment condition, the second opening degree adjustment condition, and the third opening degree adjustment condition are sequentially determined in the control flow shown in FIG. 2, but an order of determination of the conditions is not particularly limited.

When the opening degree adjustment condition is satisfied in S102 to S104, the control unit 9 sets the second target value to the target value for the opening degree adjustment of the branch channel expansion valve 7 (S105). The control unit 9, for example, reads the second target value stored in the storage device into the memory and sets this value to a target value.

The control unit 9 then performs the superheat degree control (gas injection) adjusting the opening degree of the branch channel expansion valve 7 such that the superheat degree becomes the second target value (S106). For example, when the superheat degree control is performed before the determination of the opening degree adjustment condition, the superheat degree control is continued. On the other hand, when the discharge temperature control is performed before the determination of the opening degree adjustment condition, the discharge temperature control is switched to the superheat degree control. The control unit 9 calculates the superheat degree, for example, based on the temperature difference between the refrigerant flowing into the divided flow side flow channel 8b of the supercooling heat exchanger 8 and the refrigerant flowing out of the divided flow side flow channel 8b. The temperature of the refrigerant flowing into the divided flow side flow channel 8b is detected by, for example, a temperature sensor (not shown) whose detection element is arranged in the pipe of the injection channel 62 in the upstream of the divided flow side flow channel 8b of the supercooling heat exchanger 8. The temperature of the refrigerant flowing out of the divided flow side flow channel 8b is detected by, for example, the temperature sensor (not shown) whose detection element is arranged in the pipe of the injection channel 62 in the downstream of the divided flow side flow channel 8b of the supercooling heat exchanger 8.

Figure 4:
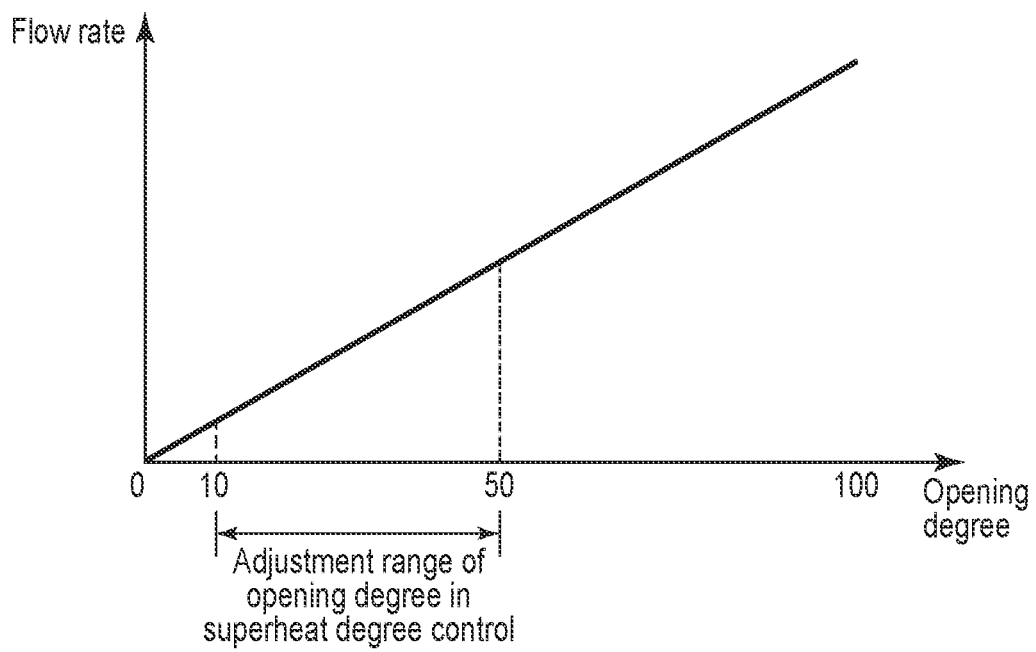
FIG. 4 is a graph showing an adjustment range of an opening degree of an expansion valve (branch channel expansion valve) in the superheat degree control in the refrigeration cycle apparatus of the first embodiment.

FIG. 4 shows the adjustment range of the opening degree of the branch channel expansion valve 7 in the superheat degree control by the relationship between the opening degree of the branch channel expansion valve 7 and the flow rate of passing refrigerant. The opening degree shown on the horizontal axis in FIG. 4 is an opening degree ratio (%) to the maximum opening degree of the branch channel expansion valve 7. The branch channel expansion valve 7 can open and close in a range from 100% to 0% of the maximum opening degree, as the specification. The opening degree shown on the horizontal axis in FIG. 4 is the flow rate of the refrigerant passing through the branch channel expansion valve 7 at the opening degree ratio shown on the horizontal axis.

As shown in FIG. 4, the control unit 9 adjusts the opening degree of the branch channel expansion valve 7 in the superheat degree control within not an entire controllable range but a predetermined range. In the example shown in FIG. 4, the control unit 9 adjusts the opening degree of the branch channel expansion valve 7 within the range in which about 10% of the maximum opening degree is set to a lower limit and about 50% of the maximum opening degree is set to an upper limit. In this case, the upper limit of the opening degree of the branch channel expansion valve 7 is smaller than an upper limit of the opening degree (100% of the maximum opening degree) of the discharge temperature control (liquid injection) to be described later. More specifically, the upper limit of the opening degree of the branch channel expansion valve 7 in the superheat degree control (gas injection) is less than or equal to 50% of the upper limit of the opening degree in the discharge temperature control (liquid injection). In addition, the lower limit of the opening degree of the branch channel expansion valve 7 is a minimum opening degree at which the flow rate of the refrigerant flowing through the branch channel expansion valve 7 is more than 0 (zero). In the example shown in FIG. 4, as a rough target of the opening degree at which the fluid (refrigerant) stops flowing in a general expansion valve, the lower limit of the opening degree of the branch channel expansion valve 7 is set to about 10% of the maximum opening degree.

By setting the upper limit of the opening degree of the branch channel expansion valve 7 to around 50% of the maximum opening degree, the opening degree of the branch channel expansion valve 7 does not open to the maximum opening degree, for example, even in the case where the superheat degree control is not stable but hunting during the gas injection process. Therefore, the liquid compression caused by the flow rate of refrigerant injected into the compressor 2 (injection flow rate) increasing and overcooling the compressor 2 can be prevented. In addition, by setting the lower limit of the opening degree of the expansion valve 7 to about 10% of the maximum opening degree, it is possible to prevent the injection flow rate from becoming 0 (zero), even in the case where the branch channel expansion valve 7 has a characteristic that the refrigerant does not flow when the opening degree is less than or equal to the predetermined opening degree. When the lower limit of the opening degree of the branch channel expansion valve 7 is not set, for example, in the case where the superheat degree of the refrigerant becomes equal to the second target value in the range less than or equal to the predetermined opening degree at which the refrigerant does not flow, the injection flow rate is stabilized at zero. In this case, the performance of the refrigeration cycle apparatus 1 is more likely to be deteriorated compared to the case where the gas injection is performed to the refrigeration cycle apparatus 1. However, it is possible to prevent the injection flow rate from becoming 0 (zero) and thus surely improve the performance of the refrigeration cycle apparatus 1 by setting the lower limit of the opening degree of the branch expansion valve 7 to about 10% of the maximum opening degree.

When the opening degree adjustment condition is not satisfied in S102 to S104, the control unit 9 sets the first target value to the target value for opening degree adjustment of the branch channel expansion valve 7 (S107). The control unit 9, for example, reads the first target value stored in the storage device into the memory and sets this value to the target value.

Then, the control unit 9 performs the discharge temperature control (liquid injection) adjusting the opening degree of the branch channel expansion valve 7 such that the discharge temperature becomes the first target value (S108). The discharge temperature control is continued, for example, when the discharge temperature control is performed before the determination of the opening degree adjustment condition. On the other hand, when the superheat degree control is performed before the determination of the opening degree adjustment condition, the superheat degree control is switched to the discharge temperature control. According to this, a dryness of the refrigerant injected into the compressor 2 from the bypass flow channel of the main flow channel 6, in other words, the branch channel 61 and the injection flow channel 62, is lowered and a cooling effect of the compressor 2 is thereby enhanced. As a result, the refrigeration cycle apparatus 1 can continue to operate while suppressing a rise in the discharge temperature of the refrigerant from the compressor 2.

Figure 5:
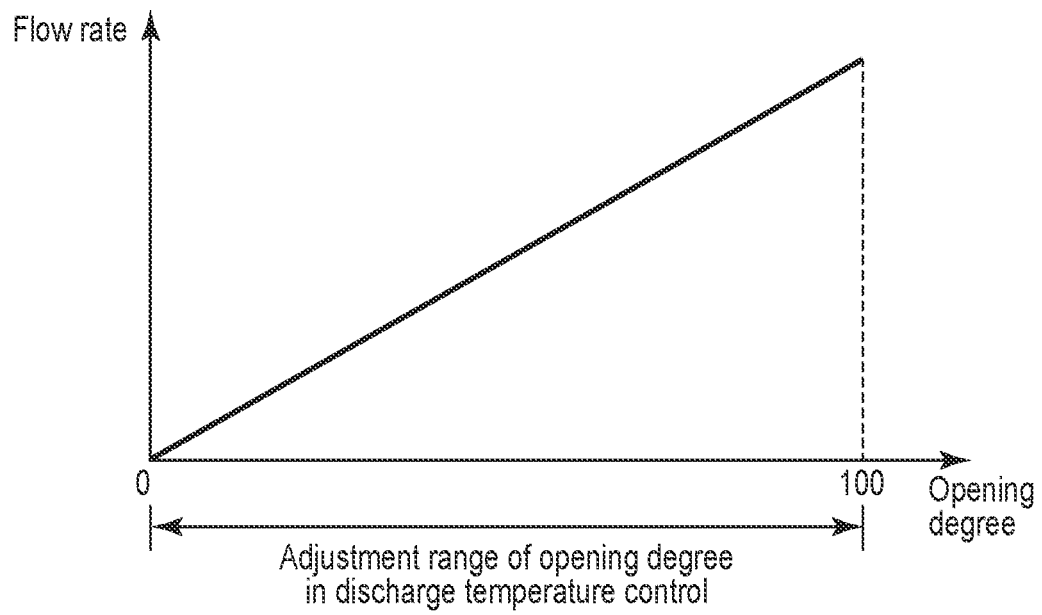
FIG. 5 is a graph showing the adjustment range of the opening degree of the expansion valve (branch channel expansion valve) in the discharge temperature control in the refrigeration cycle apparatus of the first embodiment.

FIG. 5 shows the adjustment range of the opening degree of the branch channel expansion valve 7 in the discharge temperature control by the relationship between the opening degree of the branch channel expansion valve 7 and the flow rate of the passing refrigerant. The definitions of the opening degree shown on the horizontal axis and the flow rate shown on the vertical axis in FIG. 5 are the same to those in FIG. 4. As shown in FIG. 5, the control unit 9 adjusts the opening degree of the branch channel expansion valve 7 within the entire range that is controllable based on the specification in the discharge temperature control. In other words, unlike the superheat degree control, the opening degree of the branch channel expansion valve 7 is adjusted within the range in which 0% of the maximum opening degree (fully close state) is set to the lower limit and 100% of the maximum opening degree (fully open state) is set to the upper limit.

When the superheat degree control or the discharge temperature control is performed, in other words, either any of the controls is continued or switched to the other control, the control unit 9 determines an operation suspension condition of the refrigeration cycle apparatus 1 (S109). The operation suspension condition is the condition of whether to suspend the operation of the refrigeration cycle apparatus 1, and is determined, for example, according to whether the control unit 9 received a signal indicating the operation suspension of the refrigeration cycle apparatus 1 and the like. The signal indicating the suspension of the operation is transmitted by a user and the like selecting the suspension of the operation by using, for example, a setting unit (not shown) of the refrigeration cycle apparatus 1. The setting unit consists of, for example, a panel, a switch, and a button for operation, and a display for displaying, and the like.

When the operation suspension condition is not satisfied, the control unit 9 determines the first opening degree adjustment condition again as the opening degree adjustment condition (S102), and selectively repeats following processes (S103 to S108) according to the result of the determination.

On the other hand, when the operation suspension condition is satisfied (S110), the control unit 9 suspends the operation of the refrigeration cycle apparatus 1.

In other words, a series of hybrid injection processes are repeated while the refrigeration cycle apparatus 1 is in operation. In addition, when the operation of the refrigeration cycle apparatus 1 is suspended, the series of hybrid injection processes are also terminated.

Thus, according to the present embodiment, the superheat degree control and the discharge temperature control can be appropriately switched according to the state of the operation of the refrigeration cycle apparatus 1, and the gas injection or the liquid injection can be selectively performed.

For example, switching between the superheat degree control and the discharge temperature control as below is available. When the operation of the refrigeration cycle apparatus 1 starts, the discharge temperature of the refrigerant from the compressor 2 rises. In the present embodiment, when the discharge temperature control (liquid injection) is performed in the case where the difference between the first target value and the discharge temperature is less than the predetermined difference or where the discharge temperature exceeds the predetermined threshold value which is less than the first target vale, for example, the opening degree of the branch channel expansion valve 7 is expanded. According to this, the cooling effect of the compressor 2 can be increased by reducing the dryness of the refrigerant injected into the compressor 2 and thus, the operation of the refrigeration cycle apparatus 1 can be continued while the rise in the discharge temperature is suppressed. At this time, the opening degree of the branch channel expansion valve 7 is adjusted such that the discharge temperature becomes the first target value. On the other hand, when the opening degree of the branch channel expansion valve 7 is narrowed, the injection flow rate decreases, the dryness of the refrigerant injected into the compressor 2 rises, and the discharge temperature also rises. Therefore, in the present embodiment, when the number of rotations exceeds the predetermined number of rotations relative to the compression ratio of the compressor 2, the discharge temperature control is performed such that the discharge temperature becomes the first target value and the liquid injection can be performed.

On the other hand, when the difference between the first target value and the discharge temperature is more than or equal to the predetermined difference, or when the discharge temperature is less than or equal to the predetermined threshold value which is less than the first target value, the superheat degree control (gas injection) is performed. In this case, if the discharge temperature control is performed, the opening degree of the branch channel expansion valve 7 eventually becomes fully closed and the injection flow rate becomes 0 (zero), and thus, the increasing effect of the supercool degree in the supercooling heat exchanger 8 for the refrigerant flowing through the main channel 6 cannot be obtained. Therefore, the performance of the refrigeration cycle apparatus 1 may not be improved.

Therefore, in order to improve the performance of the refrigeration cycle apparatus 1 regardless of the conditions, the heat exchange in the supercooling heat exchanger 8 needs to be performed at any time. For example, lowering the target value of the discharge temperature renders the injection flow rate larger than 0 (zero), so it is possible to obtain the increasing effect of the supercool degree. However, if the opening degree of the branch channel expansion valve 7 continues to be adjusted while keeping the discharge temperature at the target value, the liquid compression due to a liquid back operation and the like may occur and lead to a decrease in performance of the refrigeration cycle apparatus 1. Particularly, if the opening degree of the branch channel expansion valve 7 becomes maximum in the case where the superheat degree control is not stable in a state where the superheat degree is less than the second target value or the stability of the refrigerating cycle is low, the liquid compression due to the liquid back operation may occur and thus a defect may occur in the compressor 2.

Considering this, in the present embodiment, when the difference between the first target value and the discharge temperature is more than or equal to the predetermined difference, or when the discharge temperature is less than or equal to the predetermined threshold value which is smaller than the first target value, the superheat degree control is performed as described above. In addition, the superheat degree control is performed, when the opening degree of the branch channel expansion valve 7 is less than or equal to the predetermined opening degree, or when the number of rotations relative to the compression ratio in the compressor 2 is less than or equal to the predetermined number of times. In these cases, in order to suppress the liquid back operation and obtain the increasing effect of the supercool degree, a state is maintained in which the dryness of the refrigerant injected into the compressor 2 after being heat-exchanged in the supercooling heat exchanger 8 is definitely set to one or more, in other words, in which the superheat degree of the refrigerant is appropriate. Therefore, in the superheat degree control, the opening degree of the branch channel expansion valve 7 is adjusted such that the superheat degree becomes the second target value, and the gas injection is performed.

In addition, in the present embodiment, the opening degree of the branch channel expansion valve 7 in the superheat degree control is adjusted within the range in which about 10% of the maximum opening degree is set to the lower limit and about 50% of the maximum opening degree is set to the upper limit. More specifically, the upper limit value of the opening degree of the branch channel expansion valve 7 in the superheat degree control can be set to less than or equal to 50% of the upper limit of the opening degree in the discharge temperature control (about 100% of the maximum opening degree). As a result, an overcooling of the compressor 2 is prevented by the superheat degree control, and the liquid compression can be deterred.

Therefore, according to the present embodiment, the gas injection and the liquid injection can be switched appropriately in the hybrid injection, and the performance of the refrigeration cycle apparatus 1 can be improved. As a result, the stability of the operation control of the refrigeration cycle apparatus 1 in the hybrid injection process can be improved, and the reliability of the compressor 2 can be enhanced.

In the hybrid injection process shown in FIG. 2, three opening degree adjustment conditions: the first to third opening degree adjustment conditions are used as the opening degree adjustment conditions, but the number of conditions determined as opening degree adjustment conditions may be less than or equal to two or more than or equal to four. When at least one of the conditions determined is satisfied regardless of the number of conditions applied as the opening degree adjustment conditions, the opening degree adjustment condition may be determined to be satisfied despite whether the other conditions are satisfied or not. For example, a continuation of the predetermined opening degree adjustment condition for a certain period of time or longer and the like may be added to the determination conditions. The greater the number of opening degree adjustment conditions, the more appropriately the superheat degree control and the discharge temperature can be switched.

Figure 6:
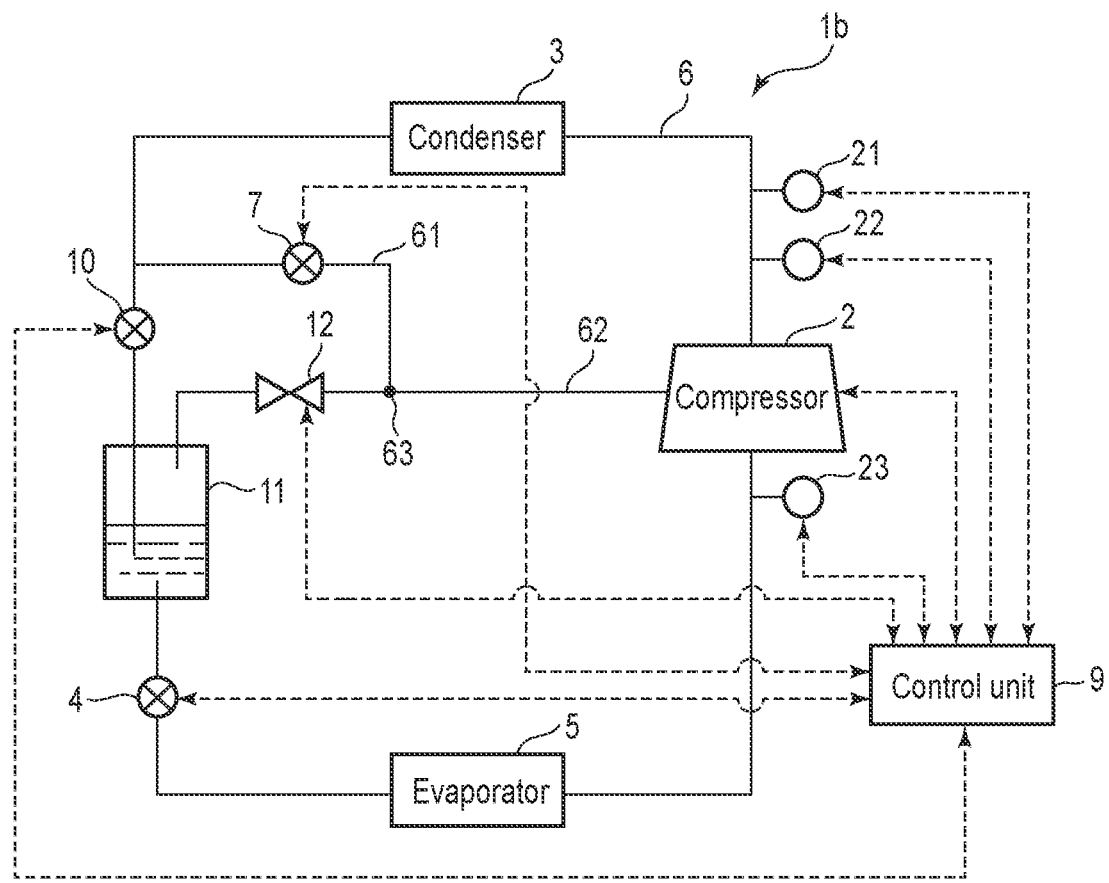
FIG. 6 is a circuit diagram schematically showing a refrigeration cycle of a refrigeration cycle apparatus according to a second embodiment.

The configuration of the refrigeration cycle apparatus capable of performing the hybrid injection process described above is not limited to the refrigeration cycle apparatus 1 shown in FIG. 1. For example, even a refrigeration cycle apparatus 1b comprising the refrigeration cycle, as shown in FIG. 6, can perform the hybrid injection process in the same manner and achieve the same advantages as the refrigeration cycle apparatus 1. The refrigeration cycle apparatus 1b comprising the refrigeration cycle shown in FIG. 6 will be described hereinafter as a second embodiment. A basic configuration of the refrigeration cycle apparatus 1b of the second embodiment is the same as that of the refrigeration cycle apparatus 1 of the first embodiment shown in FIG. 1. Therefore, constituent elements different from those of the refrigeration cycle apparatus 1 will be described hereinafter in detail. The constituent elements that are the same or similar as those of the refrigeration cycle apparatus 1 are denoted by corresponding reference numbers in figures, and detailed description thereof will be omitted or simplified.

Second Embodiment

FIG. 6 is a circuit diagram schematically showing a refrigeration cycle in a refrigeration cycle apparatus 1b of the present embodiment. As shown in FIG. 6, the refrigeration cycle apparatus 1b comprises, like the main elements of the refrigeration cycle apparatus 1, a compressor 2, a condenser 3, an expansion valve (hereinafter referred to as a first main flow channel expansion valve) 4, an evaporator 5, a four-way valve (not shown), a first detection unit (discharge temperature sensor) 21, a second detection unit (discharge pressure sensor) 22, a third detection unit (suction pressure sensor) 23, a control unit 9, and the like. In addition, the refrigeration cycle apparatus 1b comprises an expansion valve (hereinafter referred to as a second main flow channel expansion valve) 10 and a gas-liquid separator 11. These elements are connected to each other by a refrigerant pipe (main flow channel) 6 through which the refrigerant circulates.

The second main flow channel expansion valve decompresses a high-pressure liquid-phase refrigerant condensed in the condenser 3 and changes this refrigerant to a low-pressure gas-liquid two-phase refrigerant. In the present embodiment, the first main flow channel expansion valve 4 further decompresses a liquid-phase refrigerant decompressed by the second main flow channel expansion valve 10 and separated from a gas-phase refrigerant by the gas-liquid separator 11 and changes this liquid-phase refrigerant to the lower pressure gas-liquid two-phase refrigerant. The operation of each of the first main flow channel expansion valve 4 and the second main flow channel expansion valve 10 is controlled by the control unit 9.

The gas-liquid separator 11 is included in the refrigeration cycle apparatus 1b instead of the supercooling heat exchanger 8 of the refrigeration cycle apparatus 1. The gas-liquid separator 11 separates the refrigerant flowing through the main flow channel 6 without being divided by a branch channel 61, in other words, the low-pressure gas-liquid two-phase refrigerant decompressed by the second main flow channel expansion valve 10 into the gas-phase refrigerant and the liquid-phase refrigerant. The liquid-phase refrigerant separated by the gas-liquid separator 11 is decompressed by the first main flow channel expansion valve 4 and guided to the evaporator The main flow channel 6 is branched by the branch channel 61 between the condenser 3 and the second main flow channel expansion valve 10 and then bypassed to the compressor 2 through the injection flow channel 62. The branch channel 61 divides a part of the refrigerant flowing from the condenser 3 to the evaporator 5 from the main flow channel 6 in the downstream of the condenser 3 and the upstream of the second main flow channel expansion valve 10. The expansion valve (branch channel expansion valve) 7 is arranged in the branch channel 61.

The injection flow channel 62 is a flow channel where the gas-phase refrigerant separated by the gas-liquid separator 11 and the gas-liquid two-phase refrigerant passing through the branch channel expansion valve 7 are mixed appropriately and injected to the compressor 2. In other words, the injection flow channel 62 merges with the branch channel 61 at a confluence point 63, which is midway, and is connected to the compressor 2. In the present embodiment, the hybrid injection process is performed by injecting the gas-liquid two-phase refrigerant mixed appropriately in the injection flow channel 62 into the compressor 2.

An open/close valve 12 is arranged in the injection flow channel 62. The open/close valve 12 is arranged in the downstream of the gas-liquid separator 11 and the upstream of the confluence point 63 at which the injection flow channel 62 merges with the branch channel 61. The open/close valve 12 switches over whether the gas-liquid two-phase refrigerant passing through the branch channel expansion valve 7 and flowing through the branch channel 61 is merged with the gas-phase refrigerant separated by the gas-liquid separator 11 in the injection flow channel 62. The open/close valve 12 is, for example, a solenoid valve, which blocks or unblocks a flow of the gas-phase refrigerant separated by the gas-liquid separator 11 in the injection flow channel 62. In the present embodiment, an open/close control for the open/close valve 12 is performed by the control unit 9.

Similarly to the refrigeration cycle apparatus 1, the control unit 9 performs the hybrid injection process according to the control flow shown in FIG. 2 even in the refrigeration cycle apparatus 1b comprising the configurations described above.

In that case, in S106 shown in FIG. 2, when the superheat degree control (gas injection) adjusting the opening degree of the branch channel expansion valve 7 such that the superheat degree becomes the second target value is performed, the control unit 9 opens and closes (in one example, fully opens) the opening/closing valve 12. The control unit 9 calculates the superheat degree, for example, based on the temperature difference of the refrigerant before and after passing through the confluence point 63 in the injection flow channel 62. The refrigerant temperature before passing through the confluence point 63 is detected by, for example, the temperature sensor (not shown) whose detection element is arranged in the pipe of the injection flow channel 62 in the upstream of the confluence point. The refrigerant temperature after passing through the confluence point 63 is detected by, for example, the temperature sensor (not shown) whose detection element is arranged in the pipe of the injection flow channel 62 in the downstream of the confluence point.

On the other hand, in S108 shown in FIG. 2, when the discharge temperature control (liquid injection) adjusting the opening degree of the branch channel expansion valve 7 such that the discharge temperature becomes the first target value is performed, the control unit 9 opens and closes (in one example, fully closes) the opening/closing valve 12.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A refrigeration cycle apparatus comprising:
a main flow channel through which a refrigerant circulates;
a compressor discharging the refrigerant to the main flow channel;
a condenser condensing the refrigerant;
an evaporator evaporating the refrigerant;
a branch channel dividing a part of the refrigerant flowing from the condenser to the evaporator, from the main flow channel in a downstream of the condenser;
an expansion valve adjusting a flow rate of the refrigerant flowing through the branch channel;
a supercooling heat exchanger performing heat-exchanging between the refrigerant passing through the expansion valve and flowing through the branch channel and the refrigerant flowing through the main flow channel in the downstream of the condenser;
an injection flow channel injecting the refrigerant of a divided flow side flowing out of the supercooling heat exchanger to the compressor; and
a control unit determining a determination condition for adjusting an opening degree of the expansion valve and adjusting the opening degree of the expansion valve according to a target value, and
the control unit setting to the target value either a first target value for a discharge temperature of the refrigerant from the compressor, or a second target value for a superheat degree of the refrigerant flowing through the injection flow channel, according to whether the determination condition is satisfied or not, wherein
the control unit determines at least one of a first determination condition for determining whether the opening degree of the expansion valve is less than or equal to a predetermined opening degree,
a second determination condition for determining whether a difference between the first target value and the discharge temperature is more than or equal to a predetermined difference, or whether the discharge temperature is less than or equal to the predetermined threshold value less than the first target value, and
a third determination condition for determining whether the number of rotations of the compressor is less than or equal to a predetermined number of rotations with respect to a compression ratio calculated based on a discharge pressure of the refrigerant from the compressor and a suction pressure of the refrigerant to the compressor, and
when at least one of the first determination condition, the second determination condition, and the third determination condition is satisfied, the control unit performs a superheat degree control adjusting the opening degree of the expansion valve such that the superheat degree becomes the second target value,
when none of the first determination condition, the second determination condition, and the third determination condition are satisfied, the control unit performs a discharge temperature control adjusting the opening degree of the expansion valve such that the discharge temperature becomes the first target value, and
an upper limit value of the opening degree of the expansion valve in the superheat degree control is less than the upper limit of the opening degree of the expansion valve in the discharge temperature control.

2. The refrigeration cycle apparatus of claim 1, wherein the predetermined opening degree is 10% of a maximum opening degree of the expansion valve in the first determination condition.

3. The refrigeration cycle apparatus of claim 1, wherein the upper limit value of the opening degree of the expansion valve in the superheat degree control is less than or equal to 50% of the upper limit of the opening degree of the expansion valve in the discharge temperature control.

4. The refrigeration cycle apparatus of the claim 1, wherein
the compressor comprises a rotary compression mechanism.

5. A refrigeration cycle apparatus, comprising:
a main flow channel through which a refrigerant circulates;
a compressor discharging the refrigerant to the main flow channel;
a condenser condensing the refrigerant;
an evaporator evaporating the refrigerant;
a branch channel dividing a part of the refrigerant flowing from the condenser to the evaporator, from the main flow channel in a downstream of the condenser;
an expansion valve adjusting a flow rate of the refrigerant flowing through the branch channel;
a gas-liquid separator performing a gas-liquid separation of the refrigerant flowing through the main flow channel without being divided in the branch channel;
an injection flow channel merging the gas-phase refrigerant separated by the gas-liquid separator with the refrigerant passing through the expansion valve and flowing through the branch channel to be injected to the compressor;
an open/close valve switching over whether the gas-phase refrigerant separated by the gas-liquid separator is merged with the refrigerant passing through the expansion valve and flowing through the branch channel in the injection flow channel; and
a control unit determining a determination condition for adjusting an opening degree of the expansion valve and adjusting the opening degree of the expansion valve according to a target value, and
the control unit setting to the target value either a first target value for a discharge temperature of the refrigerant from the compressor, or a second target value for a superheat degree of the refrigerant flowing through the injection flow channel, according to whether the determination condition is satisfied or not.

* * * * *